United States Patent

Soderlund

[11] 4,033,295
[45] July 5, 1977

[54] ARRANGEMENT FOR REDUCING VACUUM IN MILKING MACHINES

[75] Inventor: Leif Ake Soderlund, Ronninge, Sweden

[73] Assignee: Alfa-Laval AB, Tumba, Sweden

[22] Filed: June 12, 1975

[21] Appl. No.: 586,277

[30] Foreign Application Priority Data

June 14, 1974 Sweden ............................ 7407854

[52] U.S. Cl. .......................... 119/14.44; 119/14.08; 137/101.25
[51] Int. Cl.² .......................................... A01J 5/04
[58] Field of Search ......... 119/14.08, 14.14, 14.32, 119/14.35, 14.4, 14.44, 14.41; 137/101.25, 98; 417/40, 297.5

[56] References Cited

UNITED STATES PATENTS

| | | | |
|---|---|---|---|
| 2,667,856 | 2/1954 | Heckendorf | 119/14.44 |
| 3,786,782 | 1/1974 | Abrahamson et al. | 119/14.08 |
| 3,789,798 | 2/1974 | Reisges et al. | 119/14.08 |
| 3,861,355 | 1/1975 | Johnson et al. | 119/14.08 |

Primary Examiner—Louis G. Mancene
Assistant Examiner—Peter K. Skiff
Attorney, Agent, or Firm—Cyrus S. Hapgood

[57] ABSTRACT

A connection between a vacuum source and a conduit of a milking machine is controlled by a valve body having a position for providing a normal working vacuum in the conduit and a position for providing a reduced working vacuum in the conduit. The valve body is actuated by an element movable in a chamber in response to a pressure change in one part of the chamber communicating with the vacuum source through a passage; and a regulating device is provided for opening and closing this passage to cause movement of the valve body from one position to the other by the actuating element. The regulating device may be under the control of a milk flow indicator, so that the reduced vacuum is provided automatically whenever the milk flow is below a certain rate.

6 Claims, 1 Drawing Figure

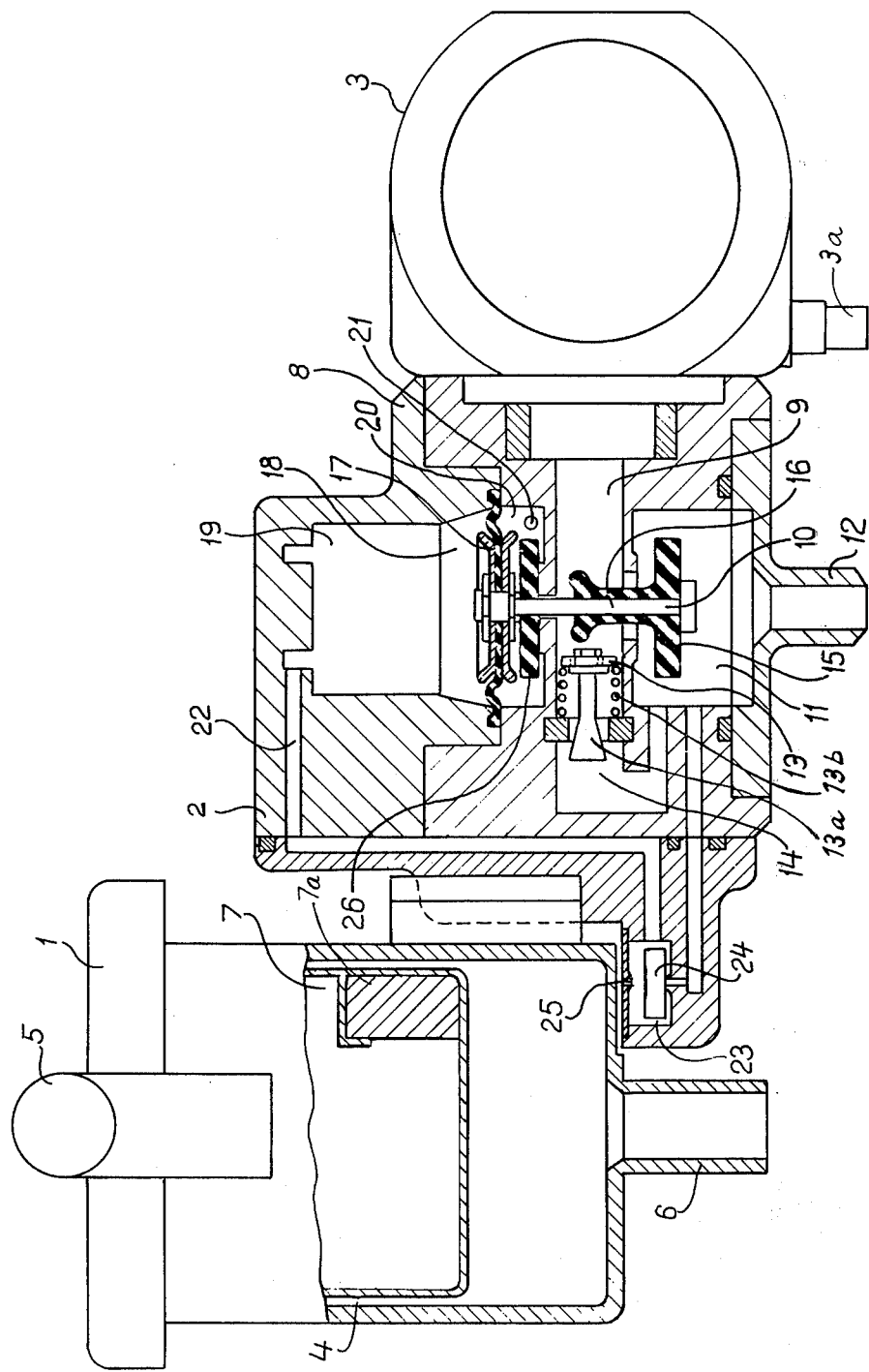

ARRANGEMENT FOR REDUCING VACUUM IN MILKING MACHINES

The present invention relates to an arrangement for effecting a reduced working vacuum in a conduit connected to a vacuum source in a milking machine, which arrangement comprises a valve body located in the connection between the vacuum source and the said conduit and movable to and from a position in which the reduced working vacuum is obtained in the conduit.

An arrangement of this kind is disclosed in Swedish Pat. No. 326,064. This patent mentions a hose which is connected to a vacuum source by way of an un-throttled connection, in which there is a stop valve, and by way of a throttled connection. A milk flow indicator is arranged to close the stop valve when the milk flow through the indicator has fallen to a certain value. The desired reduction is then obtained in the hose, as only the throttled connection remains between the hose and the vacuum source. The stop valve used according to this patent consists of a magnetic valve which is actuated by signals from the milk flow indicator.

It is generally desired to use as few electric components as possible in a milking machine equipment, in view of the surroundings in which such an equipment is used.

The principal object of the present invention is to provide an arrangement which is more reliable and also less expensive than the one described above for effecting a reduced working vacuum in said conduit of the milking machine.

The arrangement according to the invention is characterized by (1) a chamber in which an element connected to the valve body is movable in response to pressure changes in the chamber and by (2) a device arranged to connect said chamber to the vacuum source by way of a passage, whereby a movement of the valve body is obtained.

In a suitable embodiment of the invention, said passage communicates with the vacuum source by way of a connection which extends between the vacuum source and said conduit. Also, said device is arranged to allow entrance of air at atmospheric pressure to the chamber, when the connection between the chamber and the vacuum source is broken, but to prevent such air entrance when the connection between the chamber and the vacuum source is opened.

Alternatively it is possible to arrange a constantly open connection between the chamber and the surrounding atmosphere, this connection being throttled to such a degree that the necessary vacuum may still be obtained in the chamber when it is connected to the vacuum source.

If a milk flow indicator is arranged to initiate a movement of the valve body for reducing the working vacuum in said conduit, the aforementioned device may comprise a movable body which is arranged to be influenced by a float within the flow indicator. Preferably, the float is provided with a magnet so located as to attract said body when the float is in a certain position, whereby the movable body is displaced. If desired, the movable body may be influenced in some other way.

The element which is arranged to be movable in said chamber may consist of a membrane which is fitted tightly to the surrounding wall of the chamber. Of course, a piston may be used just as well. The valve arrangement is suitably such that the reduction of the vacuum takes place when the chamber is connected to the vacuum source.

The invention is not limited to such cases where said conduit is connected to the vacuum source by way of two separate connections. Only one connection is enough if this connection is provided with a valve body movable between a first position, in which the connection between the conduit and the vacuum source is kept entirely open, and a second position in which the valve body effects a throttling of said connection.

The invention is described in more detail in the following with reference to the attached drawing, in which the single illustration is a sectional view, partly in elevation, of an example of the invention.

In the drawing there is shown an apparatus comprising a flow indicator 1, an arrangement 2 according to the invention, and a pulsator 3. In the flow indicator 1 is a chamber 4 provided with an inlet 5 for liquid, such as milk, and an outlet 6. Chamber 4 contains a float 7 arranged to hold an upper position (as shown in the drawing) at a large rate of flow to the flow indicator and to assume a position at the bottom of the chamber at a small flow rate. In the float 7 is a permanent magnet 7a. The pulsator 3 is connected to the vacuum source and is arranged to be connected directly to the so-called pulsation chambers in the teat cups (not shown) in a milking machine.

The arrangement 2 according to the invention comprises a housing 8 containing a conduit 9 which, by way of a stop valve 10, is connected to a chamber 11. The latter in turn communicates with a vacuum source (not shown) by way of a connecting branch 12. The conduit 9 is connected to the pulsator 3 at one end. When the stop valve 10 is closed, the conduit 9 is still connected to the vacuum source by means of a reducing valve 13 arranged in a passage 14 between the conduit 9 and the chamber 11. The reducing valve 13 has a valve body 13a which is forced by a spring 13b to take a position in which a throttling of the connection 14 between the chamber 11 and the conduit 9 is obtained.

The valve body 15 of the stop valve 10 is connected by a stem 16 to an element in the form of a membrane 17. The membrane 17 is movable in a chamber 18 which is divided into two subchambers 19 and 20 by the membrane 17. The chamber 20 communicates with the atmosphere by way of an opening 21. The chamber 19 is connected to chamber 11 through a passage 22 and may be put under vacuum with chamber 11. (A passage could be arranged between the chamber 19 and the conduit 9, instead of the passage 22.) In the passage 22 is an enlargement 23 in which there is a movable body 24. The enlargement 23 is also connected to the atmosphere by way of an opening 25. The movable body 24, which may be influenced by the magnet 7a in the float 7, is shown in a lower position in which is closes the opening of a part of the passage 22 which is connected to the chamber 11. Through the uncovered opening 25 to the atmoshpere, air at atmospheric pressure may enter the chamber 19. When the float 7 in the flow indicator is in its lower position, the body 24 is attracted by the magnet 7a in the float and closes the vent opening 25 while unblocking the passage 22.

Instead of providing the enlargement 23 with a connection 25 to the atmosphere, as in the above-described arrangement, there may be arranged in chamber 19 a constantly open but throttled connection to the atmosphere. If this connection is throttled, vacuum may be maintained in the chamber 19 during the periods when the chamber is connected to the vacuum source, whereas atmospheric pressure may be obtained relatively quickly in the chamber 19 when the connection to the vacuum source is broken.

In order to prevent atmospheric air entering the conduit 9 from the chamber 20, a gasket 26 is provided on the under side of the membrane 17. When the stop valve 10 is open, this gasket blocks admission of any atmospheric air to the conduit 9. When the stop valve 10 is closed, the valve body 15 works as a gasket. The valve body 15 has been given a special design, as shown in the drawing.

In the operation of the described arrangement, when there is a full milk flow through the flow indicator 1, the float 7 is in an upper position and the body 24, by its own weight, has fallen down and closed the connection between the enlargement 23 of the passage 22 and the chamber 11. The chamber 19 thus has a connection to the atmosphere by way of the opening 25, and the membrane 17 is in a lower position in which the valve body 15 leaves the connection between the conduit 9 and the chamber 11 open. The conduit 9 and the spaces in the pulsator 3 and in the teat cups connected to the conduit are therefore evacuated by the vacuum source without hindrance. When the milk flow through the milk flow indicator decreases so that the float 7 sinks to the bottom of the chamber 4, the body 24 is attracted by the magnet 7a in the float so that the body is lifted and uncovers the connection between the enlargement 23 and the chamber 11. The opening 25 to the atmosphere is closed simultaneously. The chamber 19 is thus connected to the vacuum source and evacuated so that the membrane 17 is pulled upwards. As a result, the valve body 15 closes the unthrottled connection between the conduit 9 and the chamber 11, whereby only the connection through the reducing valve 13 remains between the conduit 9 and the chamber 11. The evacuation of the conduit 9 and the spaces connected to the conduit in the pulsator 3 and the teat cups must then again take place by way of the reducing valve 13.

Each time the pulsator 3 connects the pulsation chambers of the teat cups to the vacuum source 12 by way of the arrangement according to the invention, there is air of atmospheric pressure in the pulsation chambers of the teat cups and in the drive chamber of the pulsator connected at the moment. This air of atmospheric pressure momentarily causes an increased pressure in the conduit 9, and when the valve 10 is closed, this increased pressure causes a compressing of the spring 13b of the reducing valve. This means that the valve body 13a is caused to enlarge the throttled connection a little, whereby the conduit may be evacuated more quickly. When the pressure in the conduit 9 drops, the valve body 13a is forced back by the spring 13b to a position in which it strongly throttles the connection between the conduit 9 and the chamber 11. The spring 13b is dimensioned and arranged so that the pressure in the conduit 9 cannot fall below a certain value without the valve body 13a entirely closing the connection between the conduit 9 and the chamber 11.

By means of the arrangement according to the invention, it is possible to bring about a reduced pulsation vacuum when the milk flow through the milk flow indicator falls below a certain value.

I claim:

1. In combination with a conduit of a milking machine, a vacuum source and means forming a flow connection between said source and conduit, apparatus for effecting a reduced working vacuum in the conduit, said apparatus comprising a valve body disposed in said flow connection and movable to and from a position in which the reduced working vacuum is obtained, means forming a chamber, an element in said chamber dividing said chamber into two sub-chambers, said element being connected to said valve body for moving said body to and from said position, means forming a passage for connecting one sub-chamber to the vacuum source independently of the positioning of said valve body, said element being movable in response to a pressure change in said one subchamber, and a device operable to open and close said passage to effect movement of the valve body by said element, said passage communicating with the vacuum source by way of said flow connection, said device including means operable to allow entrance of air at atmospheric pressure to said one sub-chamber when said passage is closed and to prevent said air entrance when said passage is open.

2. The combination of claim 1, comprising also a milk flow indicator for initiating movement of said device and including a float, said means of said device comprising a movable body positioned to be influenced by said float.

3. The combination of claim 1, in which said movable element is a membrane, said chamber having a wall surrounding the membrane and to which the membrane is tightly secured.

4. The combination of claim 1, in which said element is a means operable to move the valve body to said position in response to opening of the passage by said device.

5. The combination of claim 1, comprising also means forming a second passage by-passing said valve body and maintaining a throttled vacuum communication between said source and conduit when the valve body is in said position for obtaining the reduced working vacuum.

6. The combination of claim 5, comprising also means in said second passage for increasing the throttling of said vacum communication in response to reduction of the pressure in said conduit.

* * * * *